(12) United States Patent
Kim et al.

(10) Patent No.: US 9,834,322 B2
(45) Date of Patent: Dec. 5, 2017

(54) HEIGHT ADJUSTMENT DEVICE FOR ROTUNDA OF BOARDING BRIDGE

(71) Applicants: Korea Airports Corporation, Seoul (KR); AG Co., Ltd., Seoul (KR)

(72) Inventors: Dong Soo Kim, Gyeonggi-do (KR); Seung Sang Cho, Incheon (KR); Gi Young Do, Gyeonggi-do (KR); Kwang Ho Yang, Seoul (KR); Yon Sang Cho, Busan (KR); Hyung Sik Kim, Seoul (KR)

(73) Assignees: AG CO., LTD., Seoul (KR); KOREA AIRPORTS CORPORATION, Seoul (KR)

( * ) Notice: Subject to any disclaimer, the term of this patent is extended or adjusted under 35 U.S.C. 154(b) by 0 days.

(21) Appl. No.: 15/503,518

(22) PCT Filed: Apr. 14, 2015

(86) PCT No.: PCT/KR2015/003730
§ 371 (c)(1),
(2) Date: Feb. 13, 2017

(87) PCT Pub. No.: WO2016/035963
PCT Pub. Date: Mar. 10, 2016

(65) Prior Publication Data
US 2017/0240297 A1    Aug. 24, 2017

(30) Foreign Application Priority Data
Sep. 4, 2014 (KR) .......... 10-2014-0117411

(51) Int. Cl.
*E01D 15/00* (2006.01)
*B64F 1/305* (2006.01)
*E01D 18/00* (2006.01)

(52) U.S. Cl.
CPC .............. *B64F 1/305* (2013.01); *E01D 15/00* (2013.01); *E01D 18/00* (2013.01)

(58) Field of Classification Search
CPC .......... E01D 15/00; E01D 18/00; B64F 1/305
USPC ...................................... 14/71.5, 71.3, 72.5
See application file for complete search history.

(56) References Cited

U.S. PATENT DOCUMENTS

| 4,344,200 A * | 8/1982 | Farr ......................... B64F 1/305 14/71.5 |
| 8,069,518 B2 * | 12/2011 | Saito ....................... B64F 1/305 14/71.5 |
| 2007/0031189 A1 * | 2/2007 | Stadler .................. E01F 13/046 404/6 |

(Continued)

FOREIGN PATENT DOCUMENTS

| KR | 20-1995-0003315 Y1 | 4/1995 |
| KR | 101161023 B1 | 6/2012 |

*Primary Examiner* — Raymond W Addie
(74) *Attorney, Agent, or Firm* — Dorsey & Whitney LLP (57) ABSTRACT

A height adjustment device for a rotunda can comprise: an outer column which fixes a rotunda and ascends and descends; an inner column which is connected to the outer column; a vertical screw which is placed on the lower end of the rotunda; a nut which is interlocked in correspondence to the outside diameter of the vertical screw; and rails which are provided on one side of the outer column or the inner column and are formed in correspondence to each other so as to assist the ascent and descent of the outer column.

9 Claims, 5 Drawing Sheets

(56) References Cited

U.S. PATENT DOCUMENTS

2008/0038057 A1* 2/2008 Stadler .................. E01F 13/046
              404/6
2009/0139039 A1* 6/2009 Saito ....................... B64F 1/305
              14/71.1

* cited by examiner

HEIGHT ADJUSTMENT DEVICE FOR ROTUNDA OF BOARDING BRIDGE

CROSS REFERENCE TO RELATED APPLICATIONS

This application is a national stage filing of PCT/KR2015/003730 filed 14 Apr. 2015 and claims the benefit of priority of Korean application no. 10-2014-0117411 filed 4 Sep. 2014, which is hereby incorporated herein by reference in its entirety.

TECHNICAL FIELD

The present technology relates to a rotunda height adjusting device of a boarding bridge, and more particularly, to a rotunda height adjusting device of a boarding bridge for adjusting a height of a rotunda column and distribute a lateral weight.

BACKGROUND

Because a vertical weight of a rotunda weight adjustable boarding bridge is divided by an inner column and an outer column, only a vertical screw supports a weight of each of a rotunda, a fastened tunnel, and a boarding bridge.

Because the vertical screw may bear a wind pressure applied to a side surface of the rotunda and the boarding bridge, and a lateral weight caused by a movement and a stop of the boarding bridge, a size of the vertical screw may increase or a number of vertical screws may increase more than necessary.

Thus, development of a rotunda operable in a vertical direction that can endure the lateral weight is required.

The information included in this Background section of the specification, including any references cited herein and any description or discussion thereof, is included for technical reference purposes only and is not to be regarded subject matter by which the scope of the invention as defined in the claims is to be bound.

SUMMARY

Technical Goals

An aspect of the present invention provides a rotunda height adjusting device of a boarding bridge for distributing a lateral weight to an outer column and an inner column.

Another aspect of the present invention provides a rotunda height adjusting device of a boarding bridge for decreasing a size of a vertical screw by disposing a convex rail and a concave rail on an outer column and an inner column in a longitudinal direction.

Still another aspect of the present invention provides a stable lubricating oil receiver to minimize a frictional force between a screw and a nut caused by a vertical movement of the screw.

Technical Solutions

According to an aspect of the present invention, there is provided a rotunda height adjusting device of a boarding bridge, the device for enabling the rotunda to ascend and descend, the device including an outer column configured to ascend and descend to fasten the rotunda, an inner column connected to the outer column and fastened to a ground surface, a vertical screw disposed on a lower end of the rotunda, a nut formed on an inner center portion of the outer column such that the nut is engaged with the vertical screw and corresponds to an external diameter of the vertical screw, and rails disposed on one side of the outer column or one side of the inner column, the rails corresponding to each other and allowing the outer column to ascend and descend, wherein a fastened tunnel is connected to the boarding bridge, and the rails and the nut are configured to distribute a lateral weight.

The rails may include a convex rail disposed on an outer side of the inner column and a concave rail disposed on an inner side of the outer column. The convex rail and the concave rail may be disposed in a longitudinal direction and a length of each of the convex rail and the concave rail may correspond to an ascending and a descending distance of the outer column. At least three convex rails may be disposed at an outer side of the inner column.

The rotunda height adjusting device may further include a motor and a reducer to rotate the vertical screw. The outer column may ascend and descend by a hydraulic cylinder.

The rotunda height adjusting device may further include a lubricating oil receiver configured to contain lubricating oil to decrease a frictional force between the vertical screw and the nut, the lubricating oil receiver disposed to cover an outer surface of the nut. The lubricating oil receiver may be fastened to the inner column. The nut may include at least one hole such that the lubricating oil flows.

By maintaining a gap in which an inner column and an outer column are connected and reducing bending of a vertical screw, a lateral weight of a rotunda height adjusting device of a boarding bridge may be distributed.

Effects

According to an embodiment of the present invention, it is possible to decrease a size of a vertical screw by disposing a convex rail and a concave rail on an outer column and an inner column in a longitudinal direction, such that a number of vertical screws may be minimized and a production cost may be reduced.

According to another embodiment of the present invention, it is possible to dispose rails and a nut on a column such that a pressure on a vertical screw may be decreased and the column may ascend and descend in a safe manner.

According to still another embodiment of the present invention, it is possible to provide a lubricating oil receiver to minimize a frictional force between a nut and a screw.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

DETAILED DESCRIPTION

Figure 1:
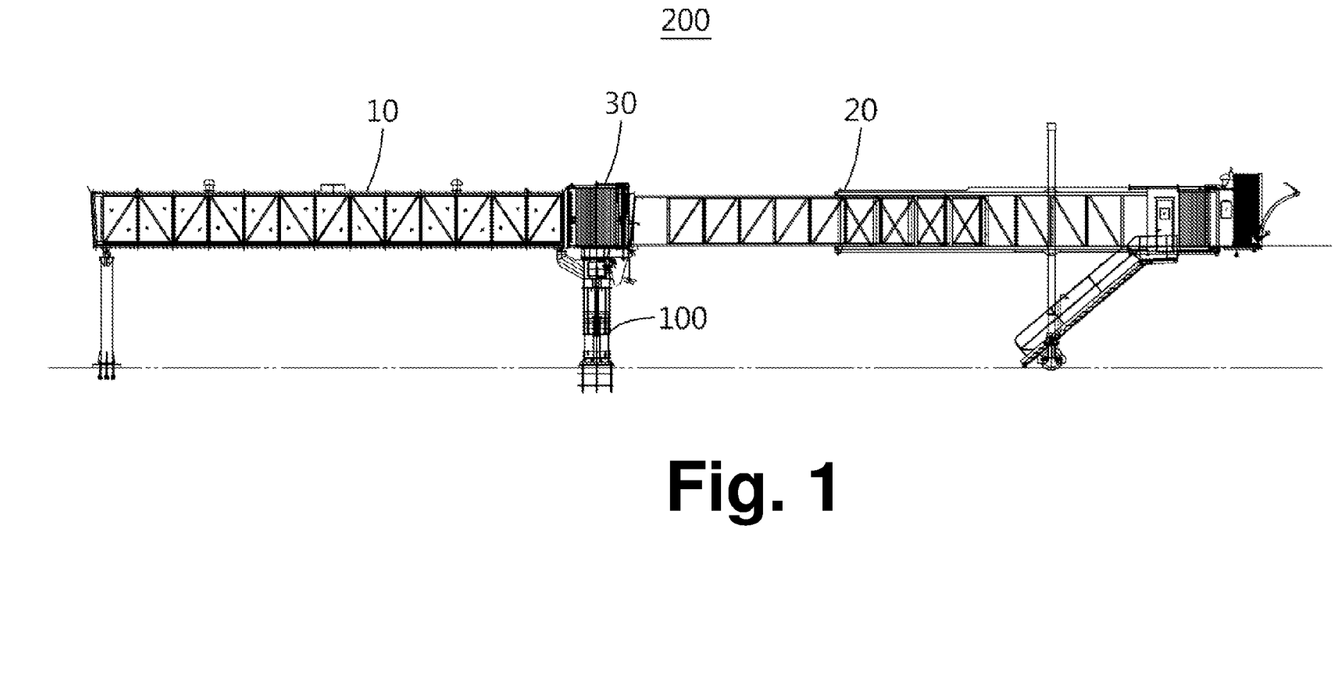
FIG. 1 is an elevation view of a movable boarding bridge including a rotunda height adjusting device according to an embodiment.

FIG. 1 is an elevation view of a movable boarding bridge 200 including a rotunda height adjusting device 100 according to an embodiment. Description is provided below.

The movable boarding bridge 200 includes a rotunda 30 to connect a fastened tunnel 10 and a boarding bridge 20 connected to a passenger terminal, and the rotunda height adjusting device 100 for enabling the rotunda to ascend and descend.

Here, the rotunda 30 is included in the rotunda height adjusting device 100 such that the rotunda 30 may rotate and a vertical position of the rotunda 30 may be adjusted. Thus, a position and a height of a gate of an aircraft may correspond to a position and a height of a cabin of the boarding bridge 20, and the cabin of the boarding bridge 20 may be connected to or disconnected from the gate of the aircraft.

Figure 2:
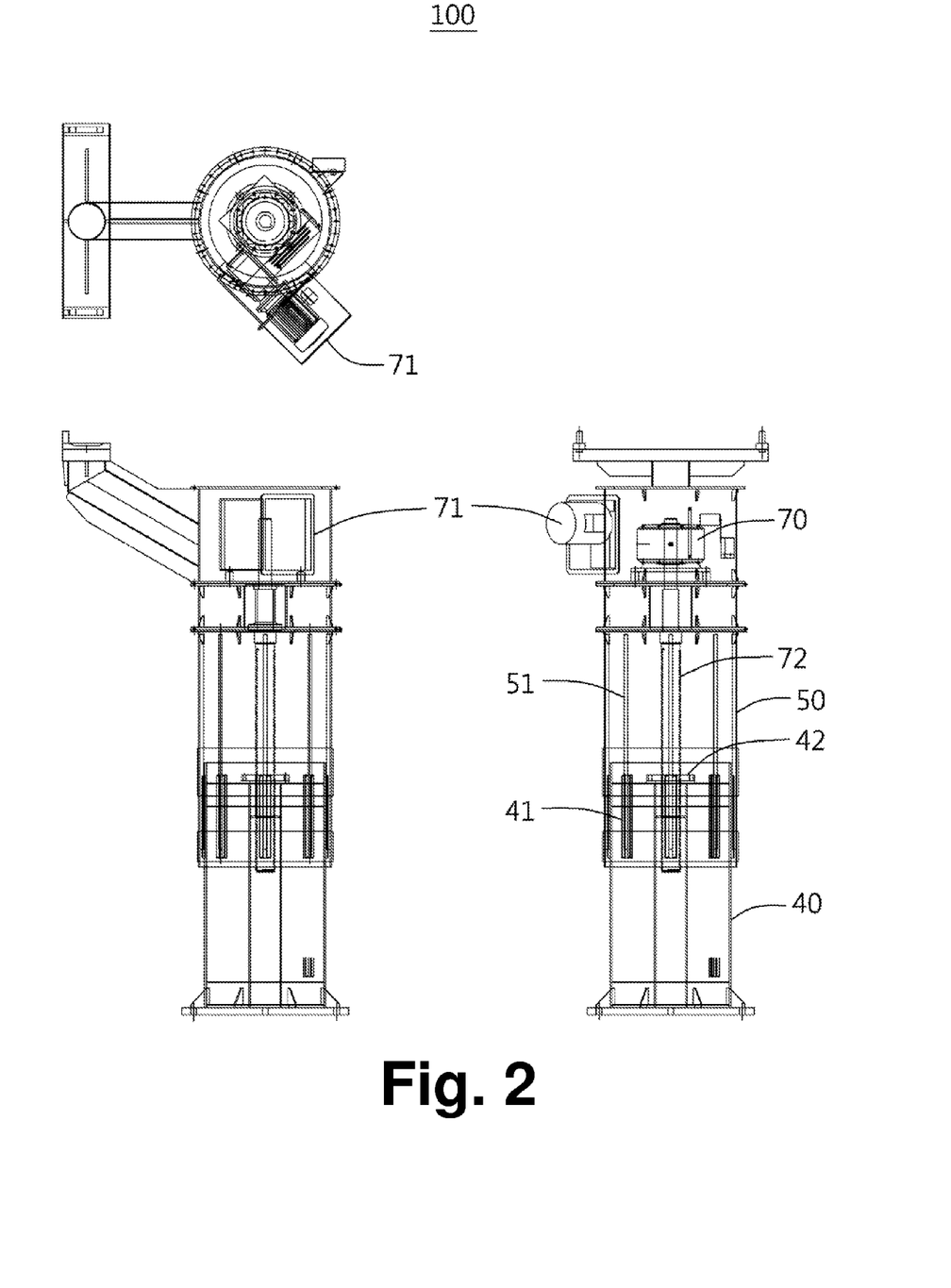
FIG. 2 illustrates a rotunda height adjusting device according to an embodiment.
Figure 3:
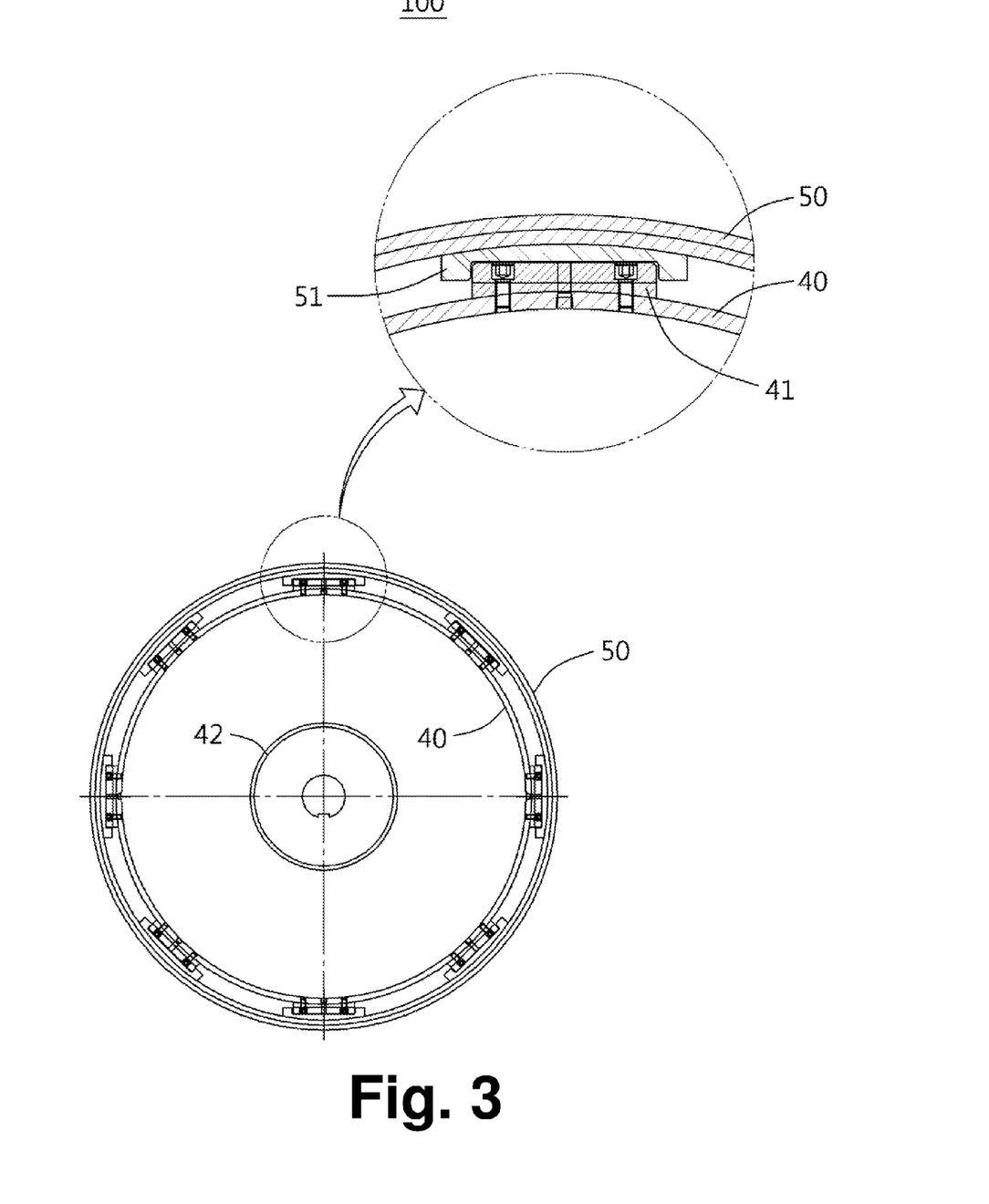
FIG. 3 illustrates rails of an inner column or an outer column according to an embodiment.

FIG. 2 illustrates a rotunda height adjusting device 100, and FIG. 3 illustrates rails 41, 51 of an inner column 40 or an outer column 50. Description is provided below.

The rotunda height adjusting device 100 may be disposed on a lower end of the rotunda 30. The rotunda height adjusting device 100 may include an outer column 50, an inner column 40, a nut 42, a vertical screw 72, a convex rail 41, a concave rail 51, a motor 71, and a reducer 70.

The outer column 50 may be disposed on the lower portion of the rotunda 30 to fasten the rotunda 30, and the outer column 50 may be fastened to a ground surface. The outer column 50 may be connected to an upper portion of the fastened inner column 40 such that the outer column 50 may ascend and descend.

The convex rail 41 may be disposed on an outer surface of the inner column 40 in a longitudinal direction, and the concave rail 51 may be disposed inside of the outer column 50 in a predetermined longitudinal direction. Rails 41, 51 of the outer column 50 may be correspondingly formed on each of the upper portion and the lower portion of the fastened inner column 40 such that the outer column 50 may stably move in a vertical direction.

The rails 41, 51 included in the outer column 50 and the inner column 40 may be correspondingly engaged to each other. The inner column 40 may be cylindrical, and the convex rail 41 may be disposed on the outer surface of the inner column 40, and a through hole may be formed in a center portion of the inner column 40 and the nut 42 may be disposed in the center portion of the inner column 40. The concave rail 51 may be included inside of the outer column 50 such that the inner column 40 is inserted. A size and a shape of the nut 42 may correspond to a size and a shape of the vertical screw 72.

It is irrelevant that convex rails 41 and concave rails 51 may be conversely disposed on an inner column 40 and an outer column 50.

Also, an outer column 50 connected to a rotunda 30 and an inner column 40 connected to a ground surface may be conversely disposed based on a site condition.

Due to rails 41, 51 of the inner column 40 and the outer column 50 disposed in a predetermined longitudinal direction and the nut 42 disposed in the center portion, the outer column 50 including the vertical screw 72 that rotates by the motor 71 and the reducer 70 may ascend and descend to adjust a position of the rotunda 30.

The vertical screw 72 may be disposed on the upper portion of the outer column 50 under the rotunda 30 so that the vertical screw 72 may rotate by a connection of the nut 42 and the vertical screw 72.

The motor 71 may be connected to the reducer 70 and the motor 71 may rotate by an electrical energy and thus, the vertical screw 72 may rotate to adjust the position of the rotunda 30.

The vertical screw 72 may be connected to the nut 42 disposed in the inner column 40 and thus, the vertical screw 72 may ascend and descend. A length of the vertical screw 72 may be formed to reach the nut 42 and the length of the vertical screw 72 may be sufficient to allow the rotunda 30 to ascend and descend. An internal diameter of the nut 42 may correspond to the outer surface of the vertical screw 72.

Hereinafter, detailed description of a movement structure of an inner column and an outer column 50 will be provided.

At least three vertical convex rails 41 may be disposed on the outer surface of each of the inner column 40 and the inner column 40, and a vertical concave rail 51 corresponding to the inner column 40 may be disposed in the outer column 50. Vertical rails 41, 51 that endure a lateral buckling force caused by a vertical movement of the rotunda 30 may be disposed, and a movement length of rails 41, 51 may correspond to a stroke of the vertical movement.

Also, when a gap is maintained between rails of the inner column 40 and the outer column 50 in which the inner column 40 is connected to the outer column 50 and the vertical screw 72 is bent due to a lateral weight of the boarding bridge 200, the gap may be maintained to be less than an allowable width of the bent vertical screw 72.

When the lateral weight is applied, a lateral supporting force may be supported by the buckling force of the vertical screw 72 and the rails 41, 51 of the inner column 40 and the outer column 50, and a motion caused by the gap may support and distribute the lateral weight by fastening the vertical screw 72 and the nut 42.

Figure 4:
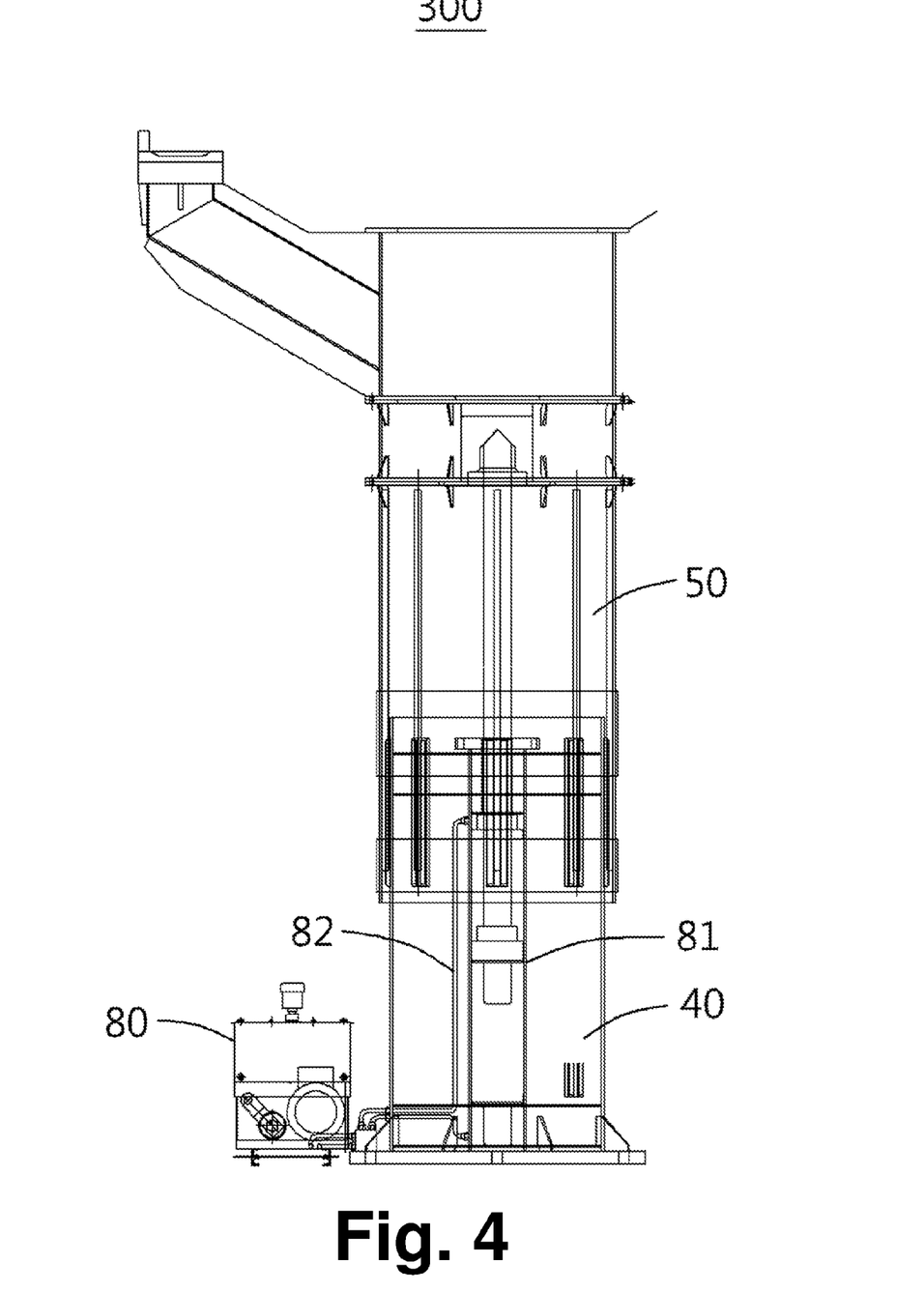
FIG. 4 illustrates an outer column that ascends and descends by an oil pressure according to an embodiment.

FIG. 4 illustrates an outer column 50 that ascends and descends by an oil pressure according to an embodiment.

Besides a configuration of the vertical screw 72 that rotates by the motor 71, a hydraulic power unit 80 that allows an oil pressure of a hydraulic cylinder 81 to vertically move in a hydraulic pipe 82 may be used in order to allow an outer column to ascend and descend such that a height of the rotunda 30 may be adjusted.

A structure of a rail 41, 51 may be identical to that of FIGS. 2 and 3. The outer column 50 may be disposed on a lower end of the rotunda 30 to fasten the rotunda 30, and an inner column 40 may be fastened to a ground surface.

The outer column 50 may be connected to an upper portion of the fastened inner column 40 such that the outer column 50 may ascend and descend.

A convex rail 41 may be disposed on an outer surface of the outer column 50 in a longitudinal direction, and a concave rail 51 may be disposed inside of the outer column 50 in a predetermined longitudinal direction. Rails 41, 51 of the outer column 50 may be correspondingly formed on each of the upper portion and the lower portion of the fastened inner column 40 such that the outer column 50 may stably move in a vertical direction.

The rails 41, 51 included in the outer column 50 and the inner column 40 may be correspondingly engaged to each other. The convex rail 41 may be disposed on the outer surface of the inner column 40 and the concave rail 51 may be disposed inside of the outer column 50 such that the inner column 40 is inserted. In addition, a hydraulic pipe may be included in the inner column 40 or the outer column 50 such that the outer column 50 may ascend and descend by an oil pressure.

The rotunda height adjusting apparatus 100 may dispose the convex rail 41 and the concave rail 51 in the outer column 50 and the inner column 40 such that an accurate vertical movement is possible, and the outer column 50 and the inner column 40 may distribute a wind pressure and a lateral weight caused when a boarding bridge 200 is stopped such that a column may ascend and descend in a safe manner.

Figure 5:
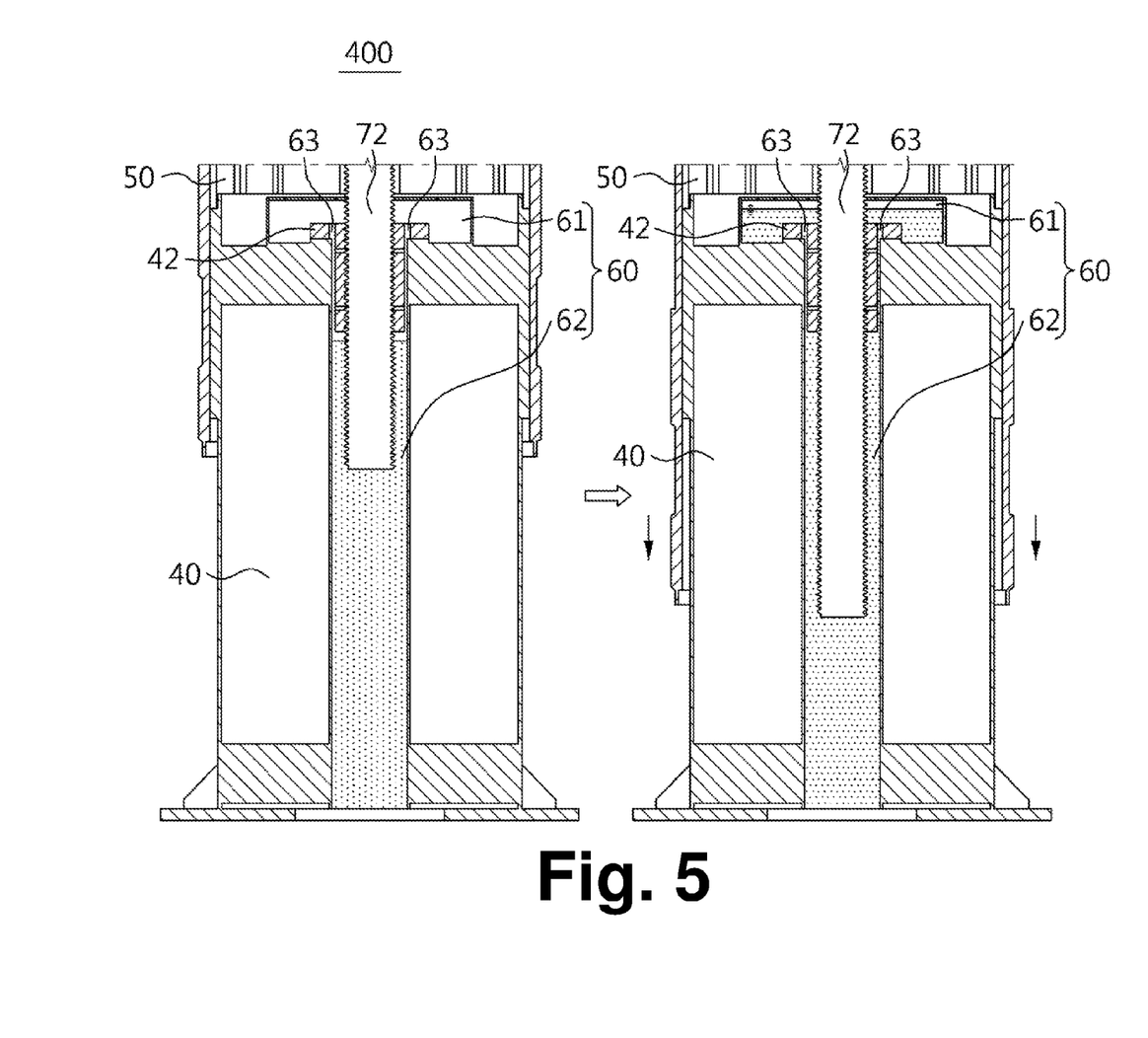
FIG. 5 illustrates a rotunda height adjusting device including a lubricating oil receiver according to an embodiment.

FIG. 5 illustrates a rotunda height adjusting device 100 including a lubricating oil receiver according to an embodiment. A structure of a rail 41, 51 may be identical to that of FIGS. 2 and 3. An outer column 50 may be disposed on a lower end of a rotunda 30 to fasten the rotunda 30, and an outer column 50 may be fastened to a ground surface. The outer column 50 may be connected to an upper portion of the fastened inner column 40 such that the outer column 50 may ascend and descend.

A convex rail 41 may be disposed on an outer surface of the outer column 50 in a longitudinal direction, and a concave rail 51 may be disposed inside of the outer column 50 in a predetermined longitudinal direction. Rails 51 of the outer column 50 may be correspondingly formed on each of the upper portion and the lower portion of the fastened inner column 40 such that the outer column 50 may stably move in a vertical direction.

The rails 41, 51 included in the outer column 50 and the inner column 40 may be correspondingly engaged to each other. The convex rail 41 may be disposed on the outer surface of the inner column 40 and the concave rail 51 may be disposed inside of the outer column 50 such that the inner column 40 is inserted. In addition, a vertical screw 72 fastened to the outer column 50 to allow the outer column 50 to ascend and descend may ascend and descend by a nut 42 disposed in the outer column 50.

Here, a lubricating oil receiver 60 may be disposed to cover an outer surface of the nut 42.

The lubricating oil receiver 60 may be disposed to cover an upper end portion, the outer surface, and a lower end portion of the nut 42 in a longitudinal direction, and the lubricating oil receiver 60 may contain lubricating oil.

The lubricating oil receiver 60 may decrease a frictional force between a vertical screw 72 and the nut 42 such that the lubricating oil flows.

The lubricating oil receiver 60 may include a lubricating oil container 62 and a lubricating oil cover 61. A lubricating oil container 62 may be fastened to a lower center of the outer column 50 in a longitudinal direction.

The nut 42 may be fastened to the upper end portion of the lubricating oil container 62 and the lubricating oil cover 61 may be disposed on the upper end portion of the nut 42. At least one hole 63 may be formed inside of the nut 42 in a longitudinal direction such that the lubricating oil flows vertically. For example, two holes may be formed one on each side of the nut 42.

The hole 63 may allow the lubricating oil to flow through the hole 63 by a pressure caused when the vertical screw 72 descends.

The lubricating oil container 62 and the lubricating oil cover 61 may be completely sealed such that the lubricating oil is protected from leaking out. When the vertical screw 72 descends, the lubricating oil may flow to the lubricating oil cover 61 by the hole 63. When the vertical screw 72 ascends, the lubricating oil may flow to an inside where the lubricating oil container 62 is disposed.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Although a few embodiments of the present invention are shown and described, the present invention is not limited to the described embodiments. Rather, it would be appreciated by those skilled in the art that changes may be made to these embodiments without departing from the principles and spirit of the invention, the scope of which is defined by the claims and their equivalents.

What is claimed is:

1. A rotunda height adjusting device of a boarding bridge, the device for enabling the rotunda to ascend and descend, the device comprising:
    an outer column configured to ascend and descend and fastened to the rotunda;
    an inner column connected to the outer column and fastened to a ground surface;
    a vertical screw disposed on a lower end of the rotunda;
    a nut formed on an inner center portion of the outer column such that the nut is engaged with the vertical screw and corresponds to an external diameter of the vertical screw; and
    rails disposed on one side of the outer column or one side of the inner column, the rails corresponding to each other and allowing the outer column to ascend and descend,
    wherein a fastened tunnel is connected to the boarding bridge, and the rails and the nut are configured to distribute a lateral weight.

2. The device of claim 1, wherein the rails include a convex rail disposed on an outer side of the inner column and a concave rail disposed on an inner side of the outer column.

3. The device of claim 2, wherein the convex rail and the concave rail are disposed in a longitudinal direction and a length of each of the convex rail and the concave rail corresponds to an ascending and a descending distance of the outer column.

4. The device of claim 2, wherein at least three convex rails are disposed at an outer side of the inner column.

5. The device of claim 1, further comprising a motor and a reducer to rotate the vertical screw.

6. The device of claim 1, wherein the outer column ascends and descends by a hydraulic cylinder.

7. The device of claim 1, further comprising a lubricating oil receiver configured to contain lubricating oil to decrease a frictional force between the vertical screw and the nut, the lubricating oil receiver disposed to cover an outer surface of the nut.

8. The device of claim 7, wherein the lubricating oil receiver is fastened to the inner column.

9. The device of claim 1, wherein the nut includes at least one hole such that the lubricating oil flows.

* * * * *